United States Patent [19]

Fussangel

[11] 4,056,040
[45] Nov. 1, 1977

[54] SHOCK ABSORBER

[76] Inventor: Hubert Fussangel, Am Hoverkamp 52, Kaarst, Germany

[21] Appl. No.: 568,390

[22] Filed: Apr. 16, 1975

[30] Foreign Application Priority Data

Apr. 20, 1974 Germany .............. 2419118
Feb. 15, 1975 Germany .............. 2506451

[51] Int. Cl.$^2$ ............................... F15B 15/22
[52] U.S. Cl. ............................... 91/25; 91/31; 91/408; 188/285; 188/287
[58] Field of Search .............. 91/408, 407, 405, 409; 92/85 B; 188/287, 285

[56] References Cited

U.S. PATENT DOCUMENTS

| | | | |
|---|---|---|---|
| 2,292,336 | 8/1942 | Farnham | 91/408 |
| 2,443,312 | 6/1948 | Gerger et al. | 91/407 |
| 3,043,277 | 7/1962 | Carlson | 91/408 |
| 3,138,066 | 6/1964 | Walker | 91/408 |
| 3,344,894 | 10/1967 | Kenworthy | 188/287 |
| 3,731,770 | 5/1973 | Bindon | 188/287 |

FOREIGN PATENT DOCUMENTS 982,003   2/1965   United Kingdom .......... 91/408

*Primary Examiner*—Paul E. Maslousky
*Attorney, Agent, or Firm*—Toren, McGeady and Stanger

[57] ABSTRACT

A shock absorber of the kind having an infinitely adjustable damping characteristic comprises a cylinder containing a piston fixed to a piston rod which extends from the cylinder and liquid within the cylinder acting on the piston. The cylinder has openings for the flow from it of the liquid upon movement of the piston in the cylinder and means are provided for restricting these openings to provide the adjustment of the damping characteristic. The openings are situated in the peripheral wall of the cylinder and are axially spaced apart from each other in positions in which they are successively passed over and closed by the piston as the piston approaches the end of its stroke at one end of the cylinder in a damping movement. Thus the flow of liquid from the cylinder is progressively further throttled by closure of the openings as the piston approaches the end of its movement. Preferably the cylinder is provided with an inlet for the supply to it of liquid under pressure as well as the outlet openings through its peripheral wall so that the shock absorber has a power cylinder function as well as a shock absorber function. Both the power function and the shock absorber function may be either single-acting or double-acting.

8 Claims, 19 Drawing Figures

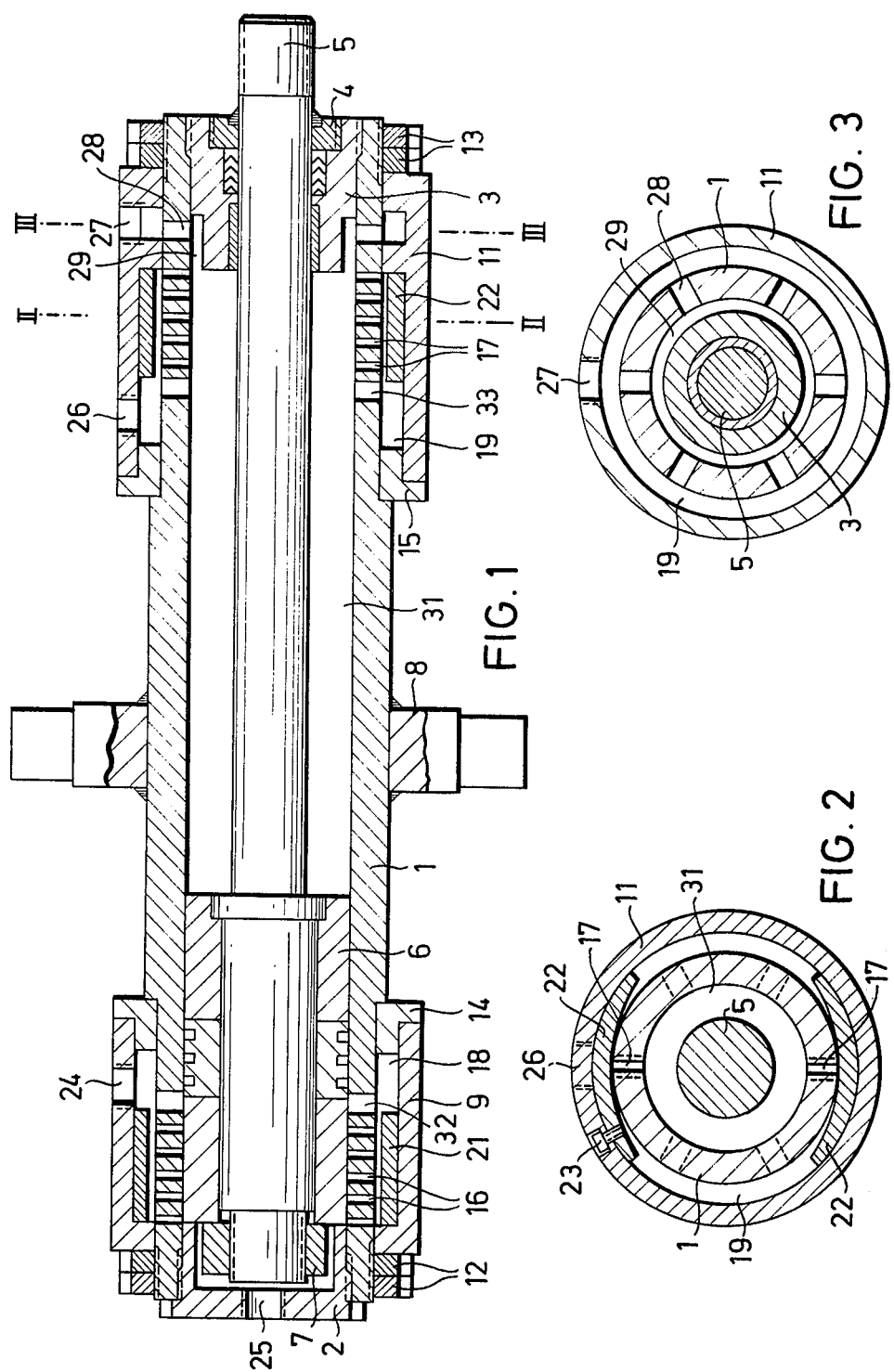

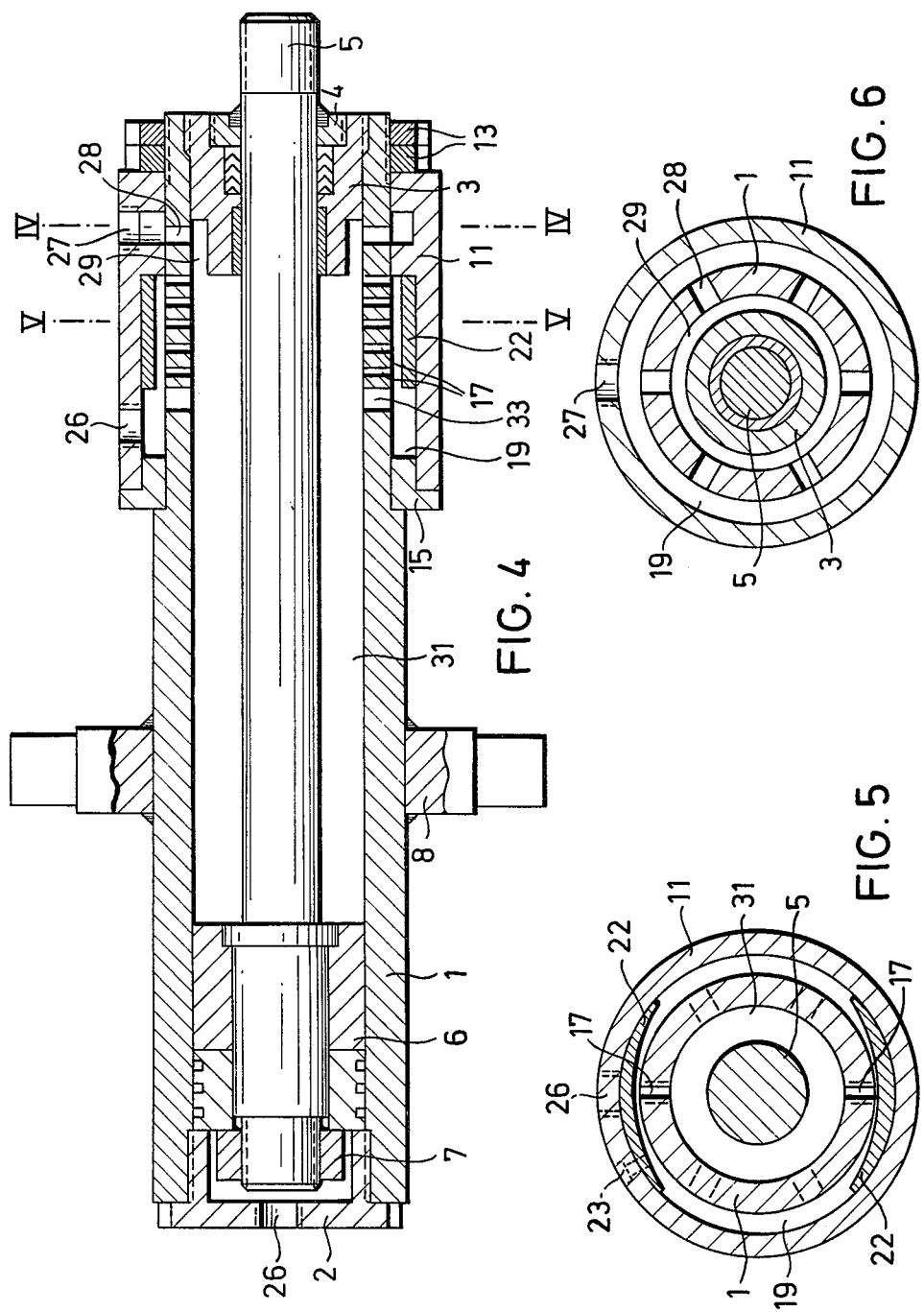

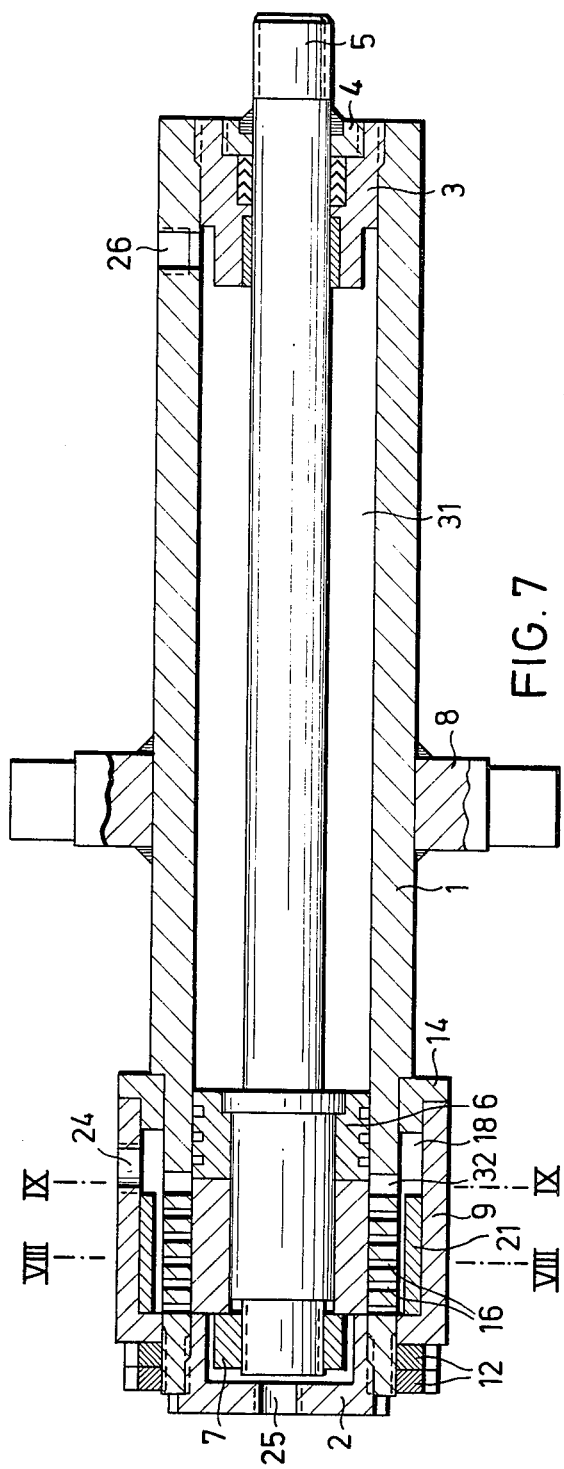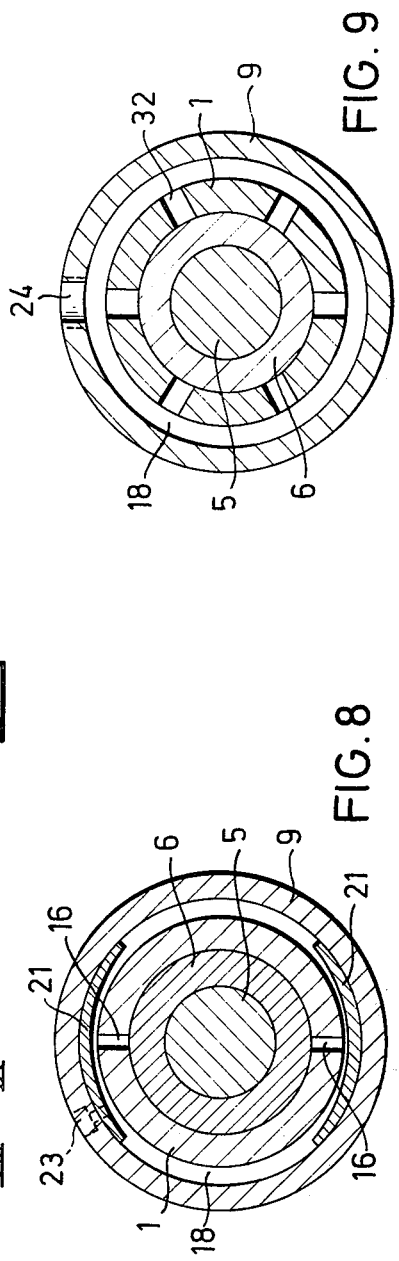

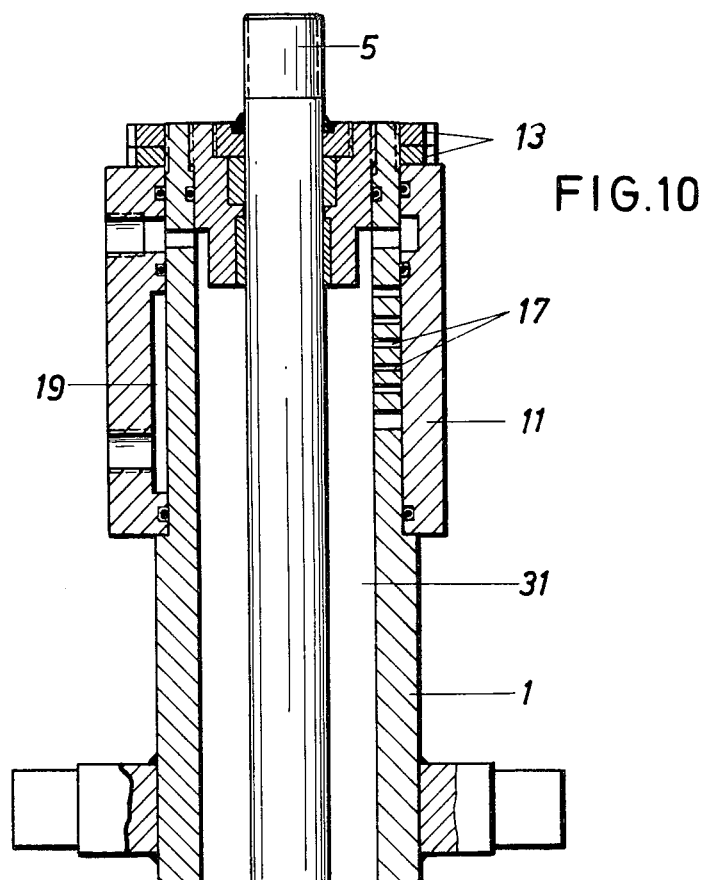
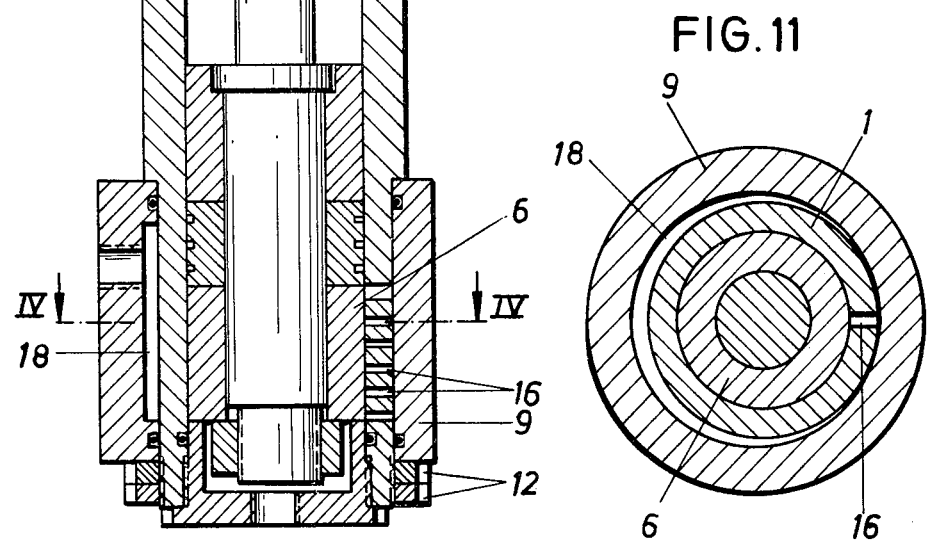
FIG.10
FIG.11

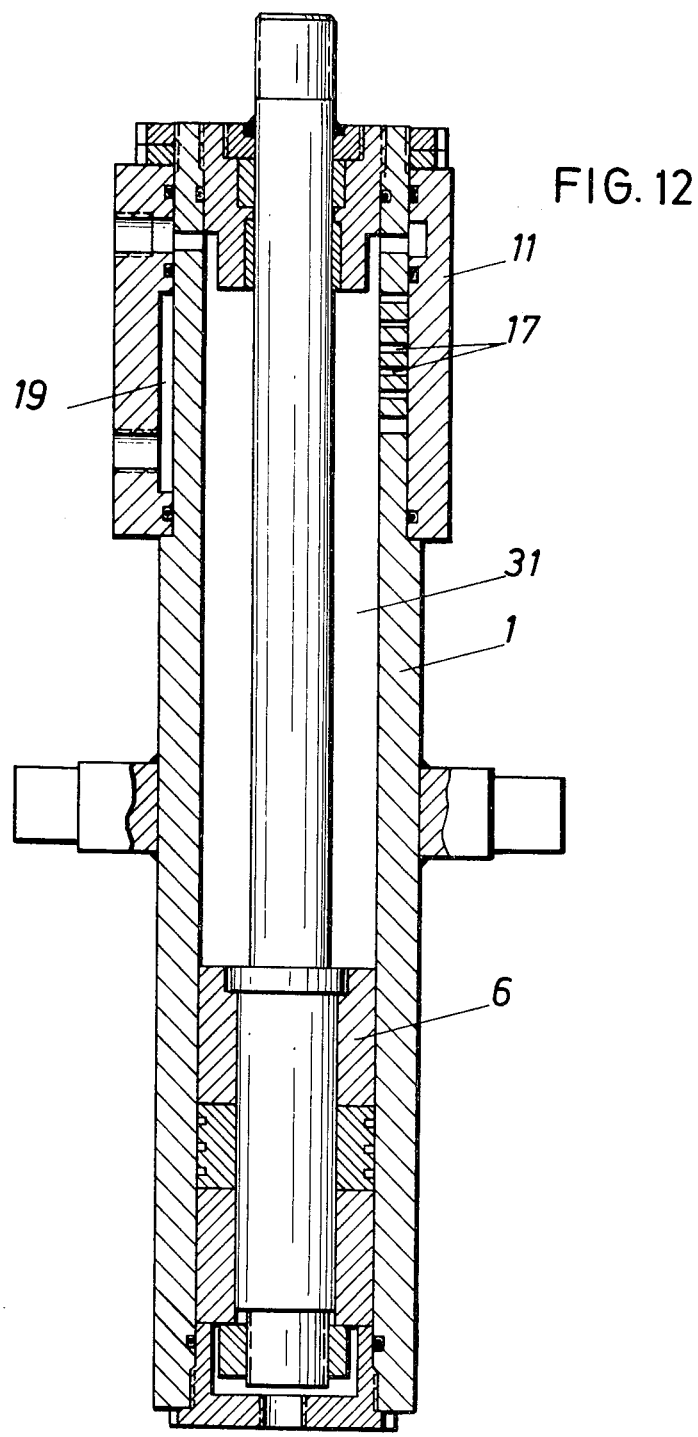

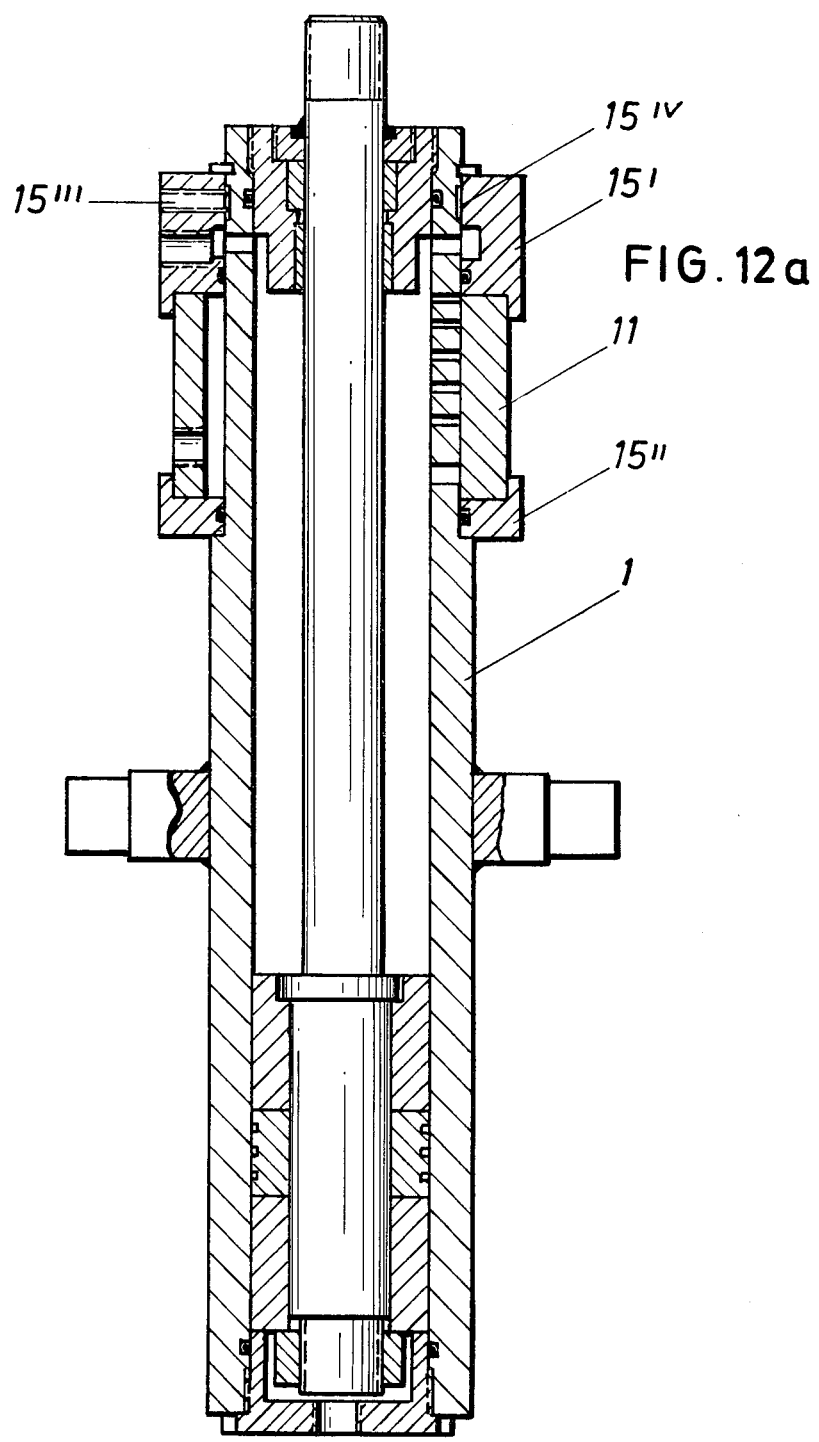

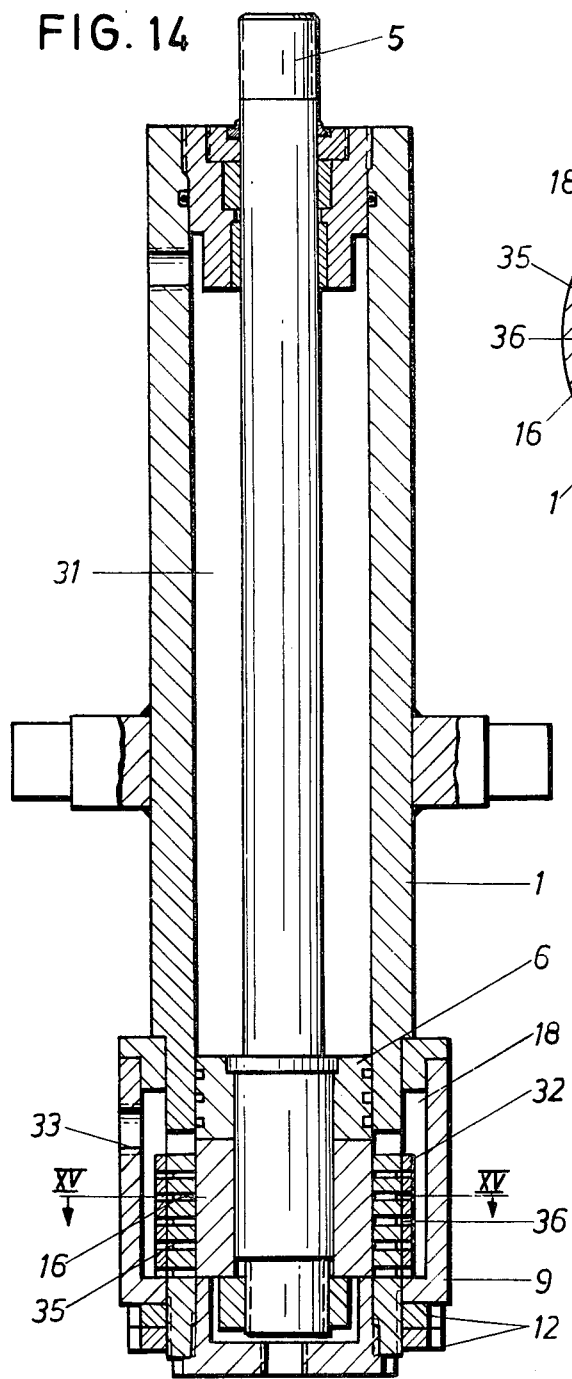
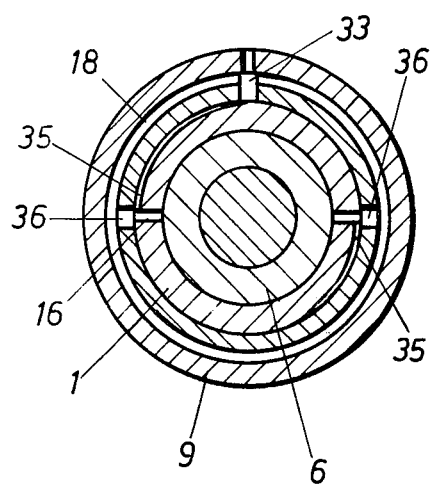
FIG. 14
FIG. 15

SHOCK ABSORBER

This invention relates to shock absorbers which have infinitely adjustable damping characteristics and which are intended for example for industrial purposes. The shock absorbers comprise a cylinder containing a piston fixed to a piston rod and liquid acting on the piston, the cylinder having openings for the flow from it of the liquid upon movement of the piston and means for restricting the openings to provide the adjustment of the damping characteristic.

Such infinitely adjustable shock absorbers of this class are used in many fields of industry, for example in order to decelerate accelerated masses or to absorb shocks caused by the accelerated masses. Typical applications for such shock absorbers are for example found in rolling mill and foundry machinery and equipment, conveying and lifting equipment, stamping machines, machine tools and construction machinery or the like, and also in heavy vehicles. The shock absorbers are predominantly used wherever there is a need for accepting large loads at high speeds, in order to convert the resulting impact forces into smaller forces of longer duration and transmit the smaller forces to a machine body, foundation or the like.

In industry and in vehicle construction furthermore, power cylinders operated by hydraulic liquid under pressure are used. Typical applications for such power cylinders are, for instance, in control and lifting jacks, and for raising, lowering or in other ways moving machine or vehicle components.

The aim of the present invention is to provide a shock absorber having an infinitely adjustable damping characteristic and comprising a cylinder containing a piston fixed to a piston rod and liquid acting on the piston, the cylinder having openings for the flow from it of the liquid upon movement of the piston and means for restricting the openings to provide the adjustment of the damping characteristic, which is especially suitable for industrial applications, which can be made in a space-saving manner and is of robust construction, which can be easily adjusted and which can also be adapted to provide it with a power cylinder capability.

According to this invention, in such a shock absorber, the openings are provided in the peripheral wall of the cylinder and are axially spaced apart from each other in positions in which they are successively passed over and closed by the piston as it approaches the end of its stroke at one end and/or the other end of the cylinder. The cylinder may be provided with an inlet for liquid under pressure to provide a single-acting power capability and the shock absorbing effect is either single-acting or double-acting.

By appropriate selection and combination of various shock absorber features and power cylinder features devices suitable for many different applications may be made and with these devices it is possible not only to control and drive machine and vehicle components in an optimum manner, but also to accelerate and/or decelerate them in a predetermined manner. Shock absorbers in accordance with the invention may thus be made with a two-fold function, namely a power function and an accelerating and damping function. By the infinite adjustment of the damping characteristic of the shock absorber it is possible to obtain a linearly accelerating and decelerating movement of the working piston. The shock absorber can be adjusted to an optimum characteristic for each purpose, so that the resultant stressing of machine or vehicle components or other members to be moved can be kept within pre-determined values.

The linear movement control makes possible both a gentle transference of the mass in movement and the achievement of a uniform counter-pressure during the deceleration phase, and also a gentle transference of the arrested mass onto a fixed abutment. This contributes considerably to the preservation and increase in working life of machines and other devices, and also makes possible a considerable increase in the speed of movement for given stress values. The shock absorber can also produce a considerable shortening of the time required for deceleration and thus a reduction of standstill time, loss of production and repair costs.

By appropriate directing of the pressurised liquid the shock absorber can be made single-acting or double-acting and may function solely as a shock absorber without a power function.

In order to adapt the shock absorber to requirements, the axial spacing of the openings in the peripheral wall of the cylinder becomes progressively smaller towards one or both ends of the cylinder. This makes a low initial loading of the piston possible and subsequent increasing acceleration by adjustment of the other openings to larger cross-sections. At the end of the accelerating movement, the full liquid pressure can be applied to the effective piston area. Within an operating stroke, the shock absorber can be made to operate as a normal power cylinder. At the end of the operating stroke, a desired gentle deceleration can then be ensured by progressive adjustment to decreasing cross-sections of the openings in the peripheral wall of the cylinder.

In order to obtain a desired linear acceleration and deceleration by varying the restriction of the openings, the restricting means may comprise an adjustment element movably mounted adjacent the outer ends of the openings. The adjusting element may comprise diametrically opposed crescent-shaped segments. By this form of construction a very sensitive control and thus regulation of the shock-absorbing characteristic is possible over a wide range. The adjusting segments may be mounted on the inner face of an outer cylinder part which surrounds and is rotatably mounted on the cylinder. To adjust the damping characteristic it is then only necessary for the outer cylinder part together with the adjusting segments, to be rotated.

Instead of adjusting segments for restricting the cross-section of the openings, an adjusting cylinder may be used. In this case, an outer cylinder part surrounds and is rotatably mounted on the cylinder and the outer cylinder part is provided with radial passages arranged to correspond in axial position to the openings through the peripheral wall of the cylinder, the outer cylinder part and the adjustment cylinder being rotationally fixed together.

An especially simple and economical and also extremely robust shock absorber is obtained if the restricting means comprises an outer cylinder part surrounding and rotatably and eccentrically mounted on the cylinder. In this manner, the adjusting elements which are otherwise required for adjusting the damping characteristic in the form of separate components, such as the adjusting cylinder or the adjusting segments, can be completely omitted, since the adjustment of the damping characteristic is now directly obtained by utilising the eccentric arrangement of the outer cylinder part with respect to the cylinder. To set the desired damping characteristic, it is only necessary for the outer cylinder part to be rotated by a desired amount relative to the cylinder. With the shock absorber constructed in this manner, some components which might be delicate are eliminated. Nevertheless, adjustment over a wide range is still obtainable, so that a very sensitive shock absorber adjustment is possible. Moreover, the cylinder parts present can be made still more robust on account of the larger space available inside the shock absorber, thus enabling the considerable forces occurring even with very large shock absorbers to be accommodated without difficulty.

In order to enable the adjustment of the shock absorber characteristic to be effected both in the acceleration and also in the deceleration range of the shock absorber there are preferably two outer cylinder parts which are mounted one on each end of the cylinder and which are rotatable independently of each other.

Some examples of shock absorbers in accordance with the invention are illustrated in the accompanying drawings, in which:

FIG. 1 is an axial section through a first example comprising a double-acting power cylinder which also constitutes a double-acting shock absorber;

FIG. 2 is a cross-section on the line II—II of FIG. 1;

FIG. 3 is a cross-section on the line III—III of FIG. 1;

FIG. 4 is an axial section through a second example comprising a power cylinder which has a piston rod and the piston rod end of which constitutes a shock absorber;

FIG. 5 is a cross-section on the line V—V of FIG. 4;

FIG. 6 is a cross-section on the line VI—VI of FIG. 4;

FIG. 7 is an axial section through a third example again comprising a power cylinder incorporating a shock absorber at one end;

FIG. 8 is a cross-section on the line VIII—VIII of FIG. 7;

FIG. 9 is a cross-section on the line IX—IX of FIG. 7;

FIG. 10 is an axial section through a fourth example comprising a double-acting power cylinder forming also a double-acting shock absorber;

FIG. 11 is a section on the line XI—XI in FIG. 10;

FIG. 12 is an axial section through a fifth example comprising a power cylinder with a shock absorber disposed at one end;

FIG. 12a is a section similar to FIG. 12 but showing a modification;

FIG. 14 is an axial section through a seventh example comprising a power cylinder with a shock absorber disposed at one end;

FIG. 15 is a section on the line XV—XV of FIG. 14;

Figure 13:
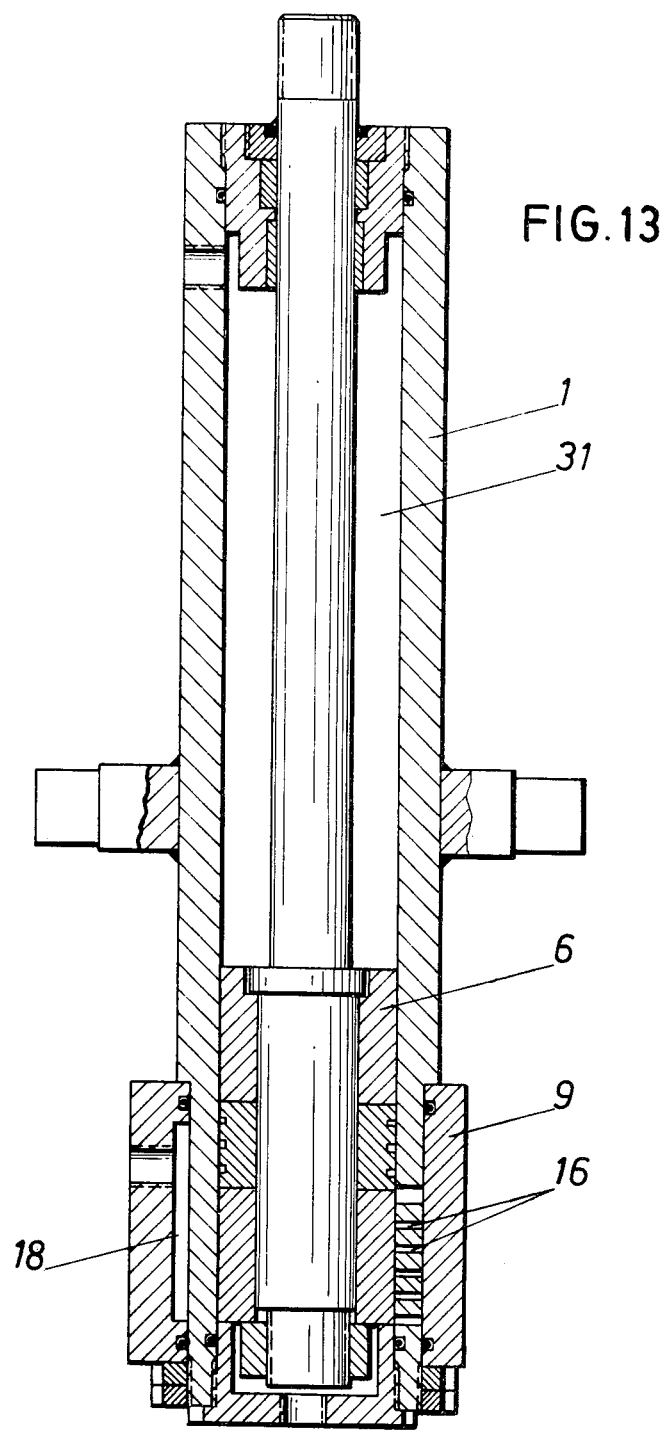
FIG. 13 is an axial section through a sixth example comprising a power cylinder with a shock absorber disposed at one end.

In the first example shown in FIGS. 1 to 3, a double-acting power cylinder 1 has screwed into it at one end a cylinder head 2, and at the other end a guide head 3. The guide head 3 is secured axially by a securing disc 4. A piston rod 5 is slidable in the guide head 3 and a piston 6 is axially slidable in the cylinder 1. The piston rod 5 is fixed at its inner end by a nut 7 to the piston 6. A mounting element, which in this example is in the form of radially projecting trunnions 8, is provided on the cylinder 1 near its middle.

The end portions of the cylinder 1 are surrounded with a clearance, by outer cylinder parts 9 and 11, which are secured by retaining nuts 12 and 13 against axial movement. At their outer ends, the outer cylinder parts 9 and 11 are rotatably mounted directly upon the cylinder 1, and at their inward ends are mounted on the cylinder through the intermediary of bearing rings 14 and 15. In parts of those portions of the cylinder 1 which are covered by the outer cylinder parts 9 and 11, there are a number of openings in the form of radial passages 16 and 17, disposed at axial spacings one from another. In the vicinity of the passages 16 and 17 and disposed in diametrically opposite rows, are adjustment segments 21 and 22 which extend in annular spaces 18 and 19 between the outer cylinder parts 9 and 11 and the cylinder 1. The adjustment segments 21, 22 are substantially sickle-shaped in cross-section and are disposed both in the retracted and in the extended range of the piston 6 in the cylinder 1. They are situated in pairs diametrically opposite each other (FIG. 2) and are fixed by screws 23 to the outer cylinder parts 9 and 11. By appropriate rotation of the outer cylinder parts 9, 11 and consequently of the adjustment segments 21, 22, the radial distances between the inner faces of the adjustment segments and the radial passages 16 and 17 can be varied, thus enabling the desired shock absorber damping characteristic to be adjusted.

In the outer cylinder part 9 there is a hydraulic liquid inlet opening 24, which is in communication with the annular space 18. The inlet opening 24 is also in communication, in a manner not shown, with a further feed opening 25, which is situated in the cylinder head 2 and is provided with a non-return valve the function of which is explained with reference to FIGS. 16 and 18.

At the piston rod end of the cylinder there is a discharge opening 26 in the outer cylinder part 11. The discharge opening 26 is in communication with the annular space 19.

Figure 17:
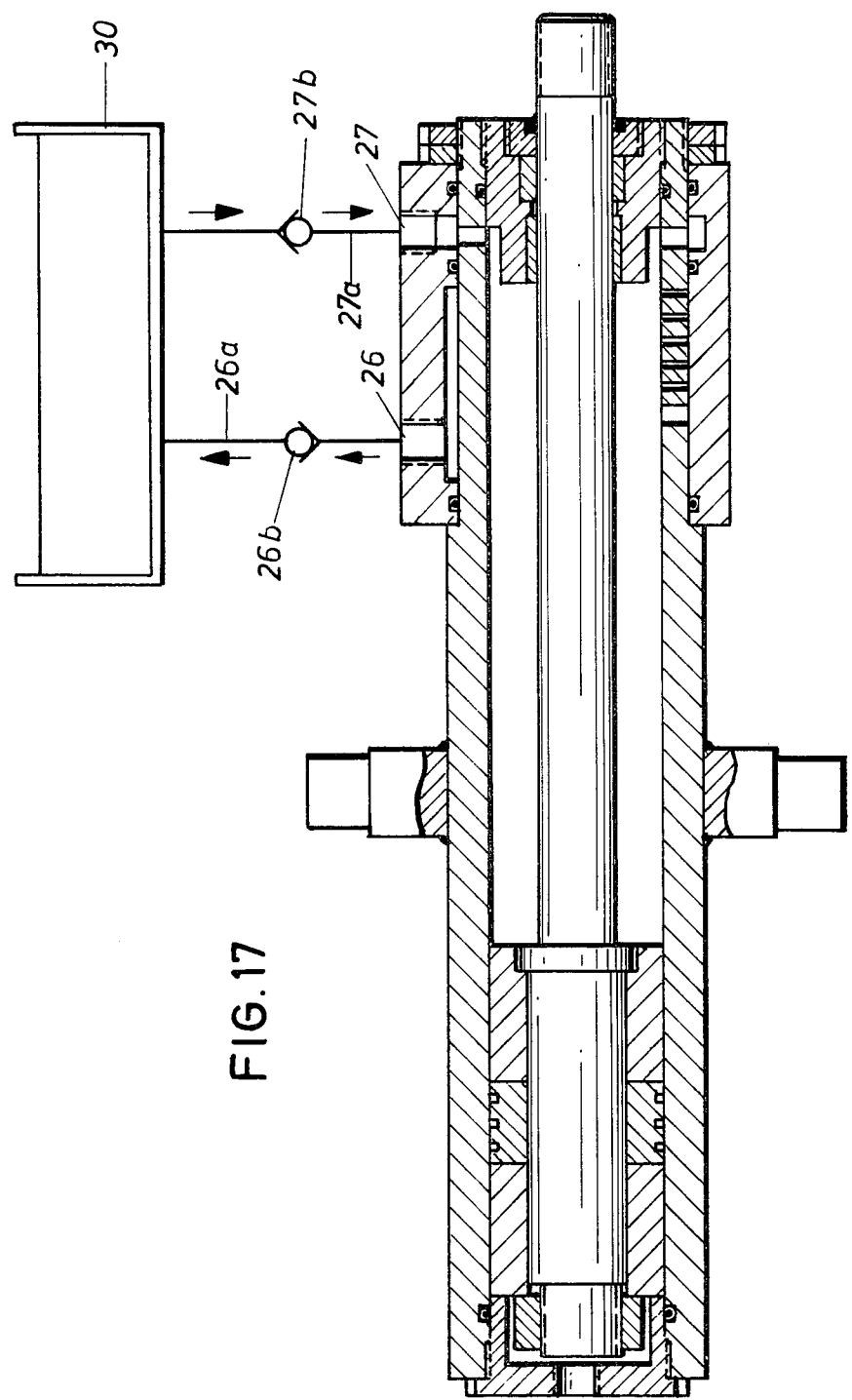
FIG. 17 shows a hydraulic control circuit for a power cylinder forming a shock absorber at one end; and, FIG. 18 shows a hydraulic control circuit for a power cylinder forming a shock absorber at the other end.
Figure 18:
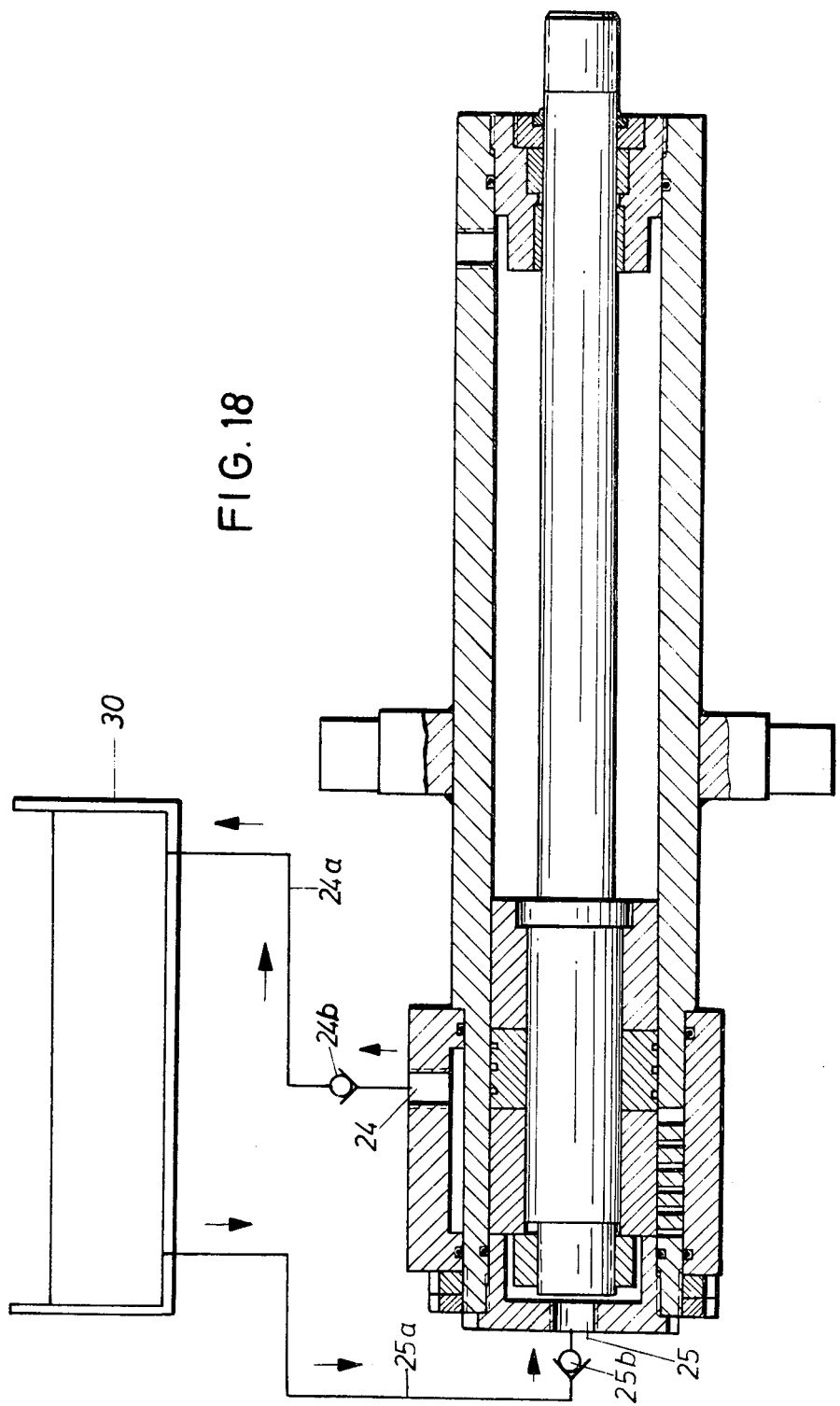

In the outer cylinder part 11 there is a further hydraulic liquid feed opening 27, which also has a non-return valve which is subsequently described in more detail with reference to FIGS. 17 and 18. The feed opening 27 is in communication, via a radial duct 28 in the working cylinder 1, with an axial duct 29 in the guide head 3. The axial duct 29 leads into a pressure chamber 31 of the cylinder 1.

As can be seen from FIG. 1, the mutual axial spacings of the radial passages 16 and 17 become progressively smaller towards the ends of the cylinder 1. This enables a desired deceleration and acceleration of the piston 6 to be achieved as is explained in more detail below. At the inward ends of the passages 16, 17, further passages 32, 33 of larger diameter extend and the purpose of these further passages will also be explained later.

The mode of operation of the shock absorber illustrated in FIGS. 1 to 3 is as follows:

To start with the shock absorber is situated in the retracted position illustrated in FIG. 1, in which the piston 6 is at the left-hand end of the cylinder 1. In this retracted position, all the radial passages 16 and also the larger diameter passages 32 are closed by the piston 6.

Thus liquid under pressure which is introduced through the inlet opening 24 into the annular chamber 18 can flow through the gap between the adjusting segment 21 and the cylinder 1 and thence into the radial passages 16. Here, the path of the pressurised liquid is initially terminated, since all the passages 16, as already mentioned, are closed by the piston 6. In order to obtain a starting movement of the piston 6, pressurised liquid acts, via the feed opening 25 and the inlet opening 24, upon the piston 6. This causes the piston 6 to move a small distance towards the right. Pressurised liquid then immediately flows into the space behind the left-hand face of the piston 6 through those radial passages 16 which are situated furthest to the left, so that this piston is moved faster towards the right. Further pressurised liquid then flows in the same way through each of the radial passages 16, as they are uncovered, so that the piston rod 5 is extended with increasing speed as a consequence of the increasing flow of pressurised liquid. The openings 32 of larger diameter have the function, after the piston 6 has moved through a predetermined distance, of applying the full liquid flow to the piston without any throttling effect.

As a result of the arrangement of the passages 16, and in dependence on the particular adjusted position of the adjusting segments 21 in relation to the passages 16, the piston 6 and with it the piston rod 5 are progressively subjected to the flow of liquid under pressure in the desired manner.

During the extending movement of the shock absorber, the fluid expelled from the chamber 31 is conducted through the radial passages 17 and 33 and the annular chamber 19, into the discharge opening 26 and thence to a reservoir. As already mentioned, the feed opening 27 is fitted with a non-return valve, which is disposed outside the shock absorber and prevents an outward flow of the pressurised liquid.

As the right-hand edge of the piston 6 approaches the extended position of the shock absorber, the radial passages 17 are successively passed over by the piston 6, so that a progressive throttling effect is produced. The deceleration thus produced can be regulated by suitable adjustment of the adjustment segments 22 provided at this end of the cylinder. It is thus possible to regulate both the acceleration and also the deceleration of the shock absorber in a linear manner.

Since the shock absorber also forms a double-acting power cylinder, the piston rod 5 can also be moved under power from its extended position into the retracted position. This is achieved initially by introducing liquid under pressure through the feed opening 27, whereby the liquid acts, via the radial duct 28 and the axial duct 29, upon the face at the piston rod end of the piston 6, so that the piston is moved by pressure away from its extended position.

As soon as the piston 6 has travelled a short distance, additional liquid arrives, via the discharge opening 26, the annular chamber 19, along the adjusting segments 22 and the passages 17, at the piston rod end face of the piston 6. Since, during this initial movement, further radial passages 17 are successively exposed, the piston is again moved with increasing acceleration into the retracted position of the shock absorber and it is again decelerated by the radial passages 16 situated at the left-hand end of the cylinder in conjunction with the adjusting segments 21. The opening 25 is at this time closed outside the shock absorber by the non-return valve, already mentioned, to prevent the outward flow of liquid.

In this example a shock absorber constructed as a driving cylinder is obtained, which makes possible both a linear deceleration and also linear acceleration and thereby ensures a progressive control.

As a variant of the above-described example, the double-acting shock absorber can incorporate only a single-acting power cylinder. The shock absorber then operates as a pushing or pulling power cylinder, depending upon whether the piston end face or piston rod end face of the piston 6 is subjected to pressurised liquid. If, for example, the piston rod end face is subjected to pressure, then the liquid on the other side of the piston flows out against no back pressure through the passages 16, the annular space 19 and the inlet opening 24 into a reservoir. As soon as the piston 6 has passed over the passages 16, an increasing back-pressure builds up in the decelerating movement of the piston and this pressure dies away again after the deceleration has been completed.

With a single-acting power cylinder 1, it is a presumption that the return stroke of the piston into its starting position is effected by external means, for example a spring or compressed air, or by connection to a machine of which the shock absorber forms part.

The above-described controlling of the shock absorber can also be effected inversely, by pressurising the piston end face with pressurised liquid and by using the piston rod end face of the piston, after the working range extending as far as the passages 17 has been passed, for the purpose of damping. In this case, the pressurised liquid flows out into a reservoir through the passages 17, the annular space 19 and through the opening 26. During any impact damping, the opening 27 is closed by its non-return valve.

The shock absorber illustrated in FIGS. 1 to 3 can also be used without any power capability that is solely as a shock absorber, by supplying no pressurised liquid. In this case, both the chambers at the piston end face and also the piston rod end face of the piston are in communication with each other through appropriate ducting and at a slight pressure with a tank, and both faces of the piston are substantially unpressurised. The non-return valves already mentioned are associated with the two openings 25 and 27 and these valves make possible the forced circulation necessary for cooling the hydraulic liquid and permit the piston to be moved from each of the end positions without throttling.

Figure 16:
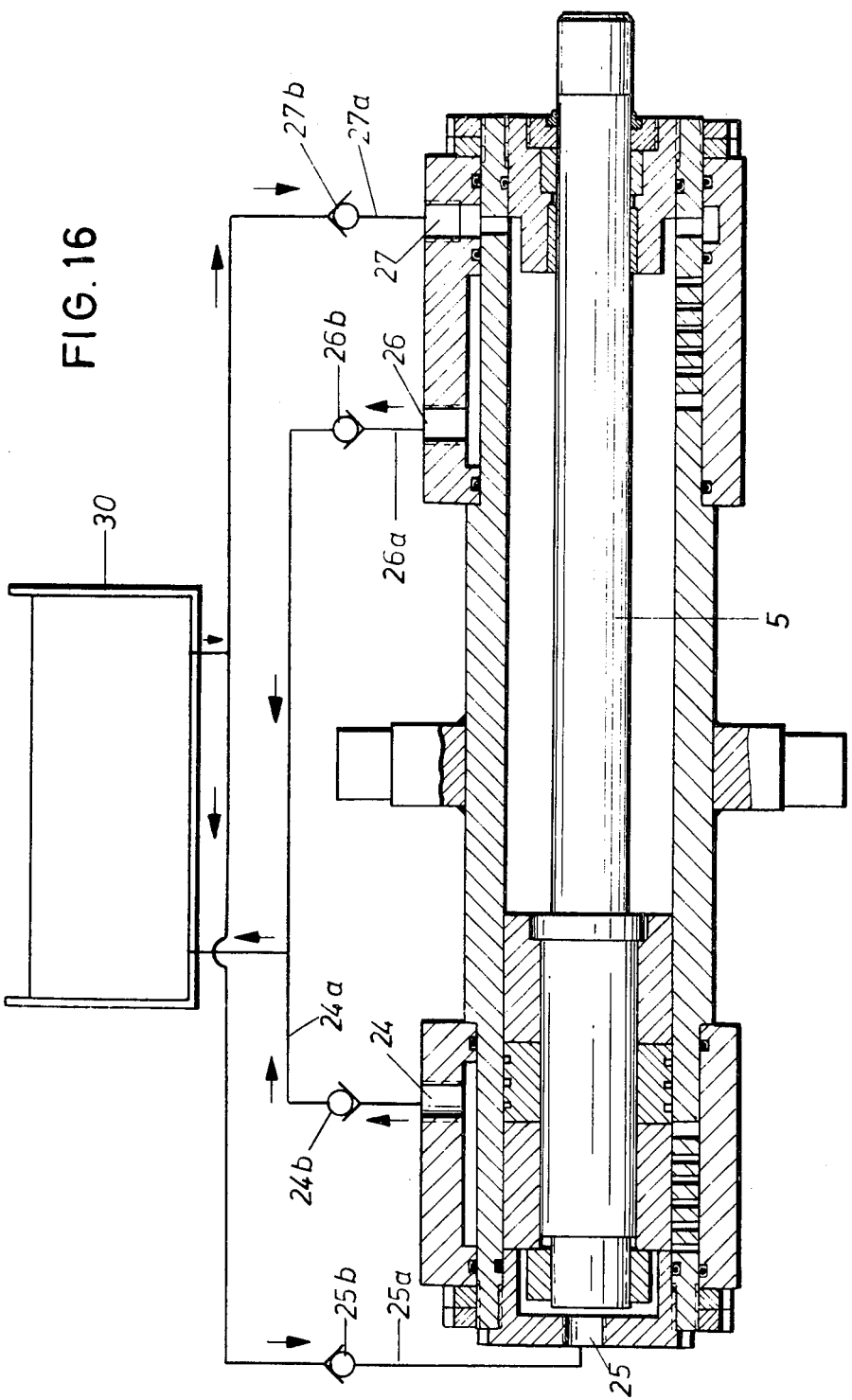
FIG. 16 shows a hydraulic control circuit for an example comprising a double-acting power cylinder forming also a double-acting shock absorber.

The example of FIGS. 1 to 3 when acting solely as a shock absorber is hydraulically connected as shown in FIG. 16. In this case, the feed openings 25, 27 and the discharge openings 24, 26 are in communication via pipes 25a, 27a and 24a, 26a, with a liquid tank 30. Non-return valves 24b, 25b, 26b, 27b, are provided in the pipes 24a, 25a, 26a, 27a. The non-return valves 24b, 26b allow flow in the direction indicated by arrows adjacent the valves and the non-return valves 25b, 27b allow flow in the inlet direction also indicated by arrows near the valves. In this manner, the necessary forced circulation of the liquid is made possible. Thus when the piston rod 5 is retracted, the opening 25 is closed by the non-return valve 25b and thus pressurised liquid passes through the discharge opening 24 and the non-return valve 24b, which now opens, into the liquid tank 30. During extension, pressurised liquid is conducted through the non-return valve 25b and the opening 25 into the shock absorber, and pressurised liquid at the other side of the piston is conducted through the discharge opening 26, the non-return valve 26b, and the pipe 26a into the liquid tank 30.

The example shown in FIGS. 4 to 6 is generally similar to the example shown in FIGS. 1 to 3, but with the difference that the damping passages are not situated at both ends of the cylinder, but only at the piston rod end. This shock absorber with damping only at the piston rod end may act as either a double-acting power cylinder, as a single-acting power cylinder acting in either direction, or solely as a shock absorber with no power capability. The hydraulic system for the case last described is illustrated in FIG. 17.

Such single-acting shock absorbers are frequently required in industry, for example in rolling mills, step-by-step transport devices are driven by two power cylinders situated one at each side of the transporting device. Since such devices operate at very high speeds, conventional limiting position dampers may become overloaded, and as a consequence of the high impacts and excessive stressing of the material, such devices frequently fail after a short period. This leads to very long standstill times and repair costs and also to an appreciable loss of production in the pull. These advantages are mitigated by using shock absorbers incorporating power cylinders in accordance with the invention. The transporting device is provided at each side with a shock absorber with single-acting damping and a single-acting power capability. In this case the cylinders are so arranged in relationship to the transport device that the piston rods are both directed towards the transport device. The damping part of the cylinder is also in each case at the end which is directed towards the transport device. If therefore, for example, the cylinder situated on the right-hand side of the transport device is pressurised with liquid and the transport device is thereby pulled towards the right, then the piston rod of the cylinder disposed on the left-hand side of the transport device is extended from its cylinder. During this movement, the piston of the left-hand shock absorber is pulled into the decelerating range of its movement and is then finally stopped. The reverse movement is then carried out by the cylinder situated at the left-hand side of the transport device, so that the deceleration then required is similarly effected by the shock absorber situated on the right-hand side of the transport device.

Another example of a shock absorber constructed in a similar manner to the example shown in FIGS. 4 to 6 is shown in FIGS. 7 to 9.

Here again, two such shock absorbers may for example be disposed one on each side of a transport device and have their piston rod ends directed towards the transport device. In contrast to the example of FIGS. 4 to 6 however, in this case the shock absorber end is disposed at that end of the cylinder which is remote from the transport device. If, for instance, the cylinder of the shock absorber on the right-hand side of the transport device is pressurised with liquid so that it pulls the transport device towards the right, then towards the end of its power stroke, its piston moves into the decelerating range so that the movement is retarded or damped.

The actuation of the shock absorber on the left-hand side of the transport device is carried out in a similar manner. Again as the piston approaches the end of its stroke, it is retarded.

As already mentioned, it is also possible with a single-acting shock absorber, not only to provide either a single-acting or double-acting power capability but also to connect the shock absorber in a hydraulic circuit in such a way that it acts only as a shock absorber. The circuit for a shock absorber situated at the piston end of the cylinder is shown in FIG. 18. During the retraction stroke, pressurised liquid is conducted through the opening 24 and the pipe 24a into the liquid tank 30, while during the extension stroke, pressurised liquid passes out of the liquid tank 30 through the pipe 25a into the cylinder. The necessary control of the flow of the pressurised liquid is effected by the appropriate construction of the non-return valves, in order firstly to produce the necessary liquid circulation for cooling the liquid and secondly to enable the piston to be moved out of its end positions by external forces. The liquid tank 30 may be unpressurised or may be under some pressure produced by air or other gas, by elastic means or by a pump.

A particular example of use of a shock absorber in accordance with this invention is for the drive of a flying shears in a rolling mill, where it is necessary to provide a drive movement which is both impact-free and is also suitably accelerated and decelerated.

The shock absorbers incorporating power cylinders illustrated in FIGS. 10 to 13 are generally similar to the examples shown in FIGS. 1 to 9, but with the difference that no adjustment segments are provided for setting the shock absorber damping characteristic. Instead an eccentric and rotatable arrangement of the cylinder 1 with respect to the outer cylinder parts 9, 11 is utilised for this purpose. In the example shown in FIGS. 10 and 11, which comprises a double-acting power cylinder 1, an annular space 18, 19 is produced by the eccentric arrangement between each outer cylinder part 9, 11 and the cylinder 1, but as can be seen from FIG. 11, this is crescent-shaped. By rotation of the outer cylinder parts 9, 11 relative to the cylinder 1, the openings 16, 17 provided near to its ends can be opened or restricted to a greater or lesser extent. Thus pressurised liquid can flow out of the damping chamber 31 into the appropriate annular space 18 or 19 during the extension stroke and retracting stroke with a greater or lesser throttling effect to adjust the damping characteristic. The outer cylinder parts 9, 11 can be secured in their adjusted rotational positions by nuts 12, 13.

In the example shown in FIG. 12, the outer cylinder part 11 is present only at the piston rod end of the cylinder, whereas in the example shown in FIG. 13, only the outer cylinder part 9 at the piston end of the cylinder is present. The mode of action of this shock absorber corresponds to that already explained for the examples shown in FIGS. 4 and 7.

The example shown in FIG. 12a is modified in that the outer cylinder part 11 is journalled eccentrically not directly on the cylinder 1, but by means of eccentric support rings 15', 15". In the set rotational positions, the outer cylinder part 11 can be secured by a screw 15''' which is screwed into the supporting ring 15' and the inner end of which engages in an annular groove 15$^{IV}$ in the cylinder 1.

The shock absorbers illustrated in FIGS. 10 to 13, having a power capability and one or two shock absorber capabilities, make it possible, on account of the infinitely adjustable damping characteristic, to accelerate and/or decelerating the movement of the piston 6 linearly. Further, they are suitable on account of their robust construction for a large number of practical applications so that the loadings of machine or vehicle components or other moving parts can be maintained within predetermined values. The conservation resulting from this leads to a considerable increase in the working life of the machines or vehicles. An increase in the maximum speed of movement for a given loading is also possible. This leads to an appreciable shortening of the time required for deceleration and also to a reduction of standstill times, production losses and repair costs.

The example shown in FIGS. 14 and 15 comprises a power cylinder having a shock absorber at its piston end, and thus corresponds largely to the example shown in FIGS. 7 and 13. The difference lies in the means for adjustment of the shock absorber characteristic. This is effected, in the example shown in FIGS. 14 and 15, by an adjustment cylinder 32 which is rotatably mounted directly upon the drive cylinder 1 and is rotationally fixed by a coupling bolt 33 to the outer cylinder part 9.

The outer cylinder part 9 can be fixed together with the adjustment cylinder 32, in an rotational position by a screw-threaded nut 12. The damping chamber 31 is in communication with the annular chamber 18 via the passage 16, eccentrically disposed annular grooves 35 in the driving cylinder 1 and radial passages 36 in the adjustment cylinder 32. The adjustment cylinder 32 can be rotated by means of the outer cylinder part 9 relative to the cylinder 1 in such a manner that the passage 16 and the passages 36 are nearly in register with one another as illustrated in FIG. 15. Thus when force is applied to the piston rod 5 and the piston 6 descends, liquid can flow out of the damping chamber 31 through the passage 16 and a very short length of the grooves 35 in a largely unthrottled manner into the passages 36 and from thence into the annular chamber 18. With this setting of the adjustment cylinder 32 relative to the cylinder 1, a very slight damping effect is obtained.

By contrast, a very pronounced damping effect is obtained when the adjustment cylinder 32 has been rotated through 90° relative to the cylinder 1, since then the liquid flow from the damping chamber 31 through the passage 16 and the annular grooves 35 into the passages 36 is severely throttled. It follows that by appropriate rotation of the adjustment cylinder 32 the desired damping characteristic of the shock absorber can be infinitely adjusted in a very simple manner.

The construction in accordance with the invention can also be applied to shock absorbers of lighter construction, especially those for automobiles, in which the outer cylinder part and the adjustment cylinder are together rotatably mounted on the lower end of the cylinder. It also of couse is possible to rotate the cylinder 1 and to hold the outer cylinder part and the adjustment cylinder stationary.

I claim:

1. A shock absorber assembly having variable damping characteristics comprising: main cylinder means defined by peripheral wall means; piston means axially slidably mounted within said main cylinder means and movable relative thereto under the influence of pressure fluid within said main cylinder means; flow means for effecting pressure fluid flow to and from said main cylinder means to control relative movement between said piston means and said main cylinder means; said flow means including means defining openings in said peripheral wall in flow communication with said main cylinder means, said openings being axially spaced apart from each other along said peripheral wall in positions in which said openings are successively passed over to be closed and opened by said piston means during movement thereof relative to said main cylinder means; and adjustment means for varying fluid flow thrugh said openings to provide adjustment of said damping characteristics of said shock absorber assembly, said adjustment means comprising outer cylindrical means rotatably mounted relative to said main cylinder means and spaced radially therefrom, and arcuate adjustment elements comprising substantially crescent-shaped sections mounted upon said outer cylinder means for rotation therewith relative to said main cylinder means, said crescent-shaped sections having surface means extending eccentrically relative to said main cylinder means and over said openings to adjustably vary the flow path through said openings upon rotation of said outer cylindrical means relative to said main cylinder means.

2. A shock absorber according to claim 1 wherein said main cylinder means further comprises means defining an inlet for liquid under pressure to act upon said piston means to provide said shock absorber with a single-acting power capability.

3. A shock absorber according to claim 1 wherein said main cylinder means further comprises means defining inlets for liquid under pressure at both ends of said main cylinder means for said liquid to act upon said piston means from one end or the other end of said main cylinder means thereby providing said shock absorber with a double-acting power capability.

4. A shock absorber according to claim 1 wherein said axial spacing of said openings in said peripheral wall means becomes progressively smaller toward one end of said main cylinder means.

5. A shock absorber according to claim 1 wherein said crescent-shaped sections comprise diametrically opposed segments.

6. A shock absorber according to claim 1 wherein said outer cylindrical means comprise two outer cylindrical parts surrounding said main cylinder means, one outer cylindrical part being adjacent each of the ends of said main cylinder means and means rotatably mounting said two outer cylindrical parts on said main cylinder means for rotation independently of each other.

7. A shock absorber according to claim 1 wherein said openings in said peripheral wall means extend axially from at least one end of the main cylinder means, with said openings furthest from said one end of said main cylinder means being of greater cross sectional area than the remainder of said openings.

8. A shock absorber according to claim 1 further comprising fluid discharge openings defined in said outer cylindrical means, said fluid discharge openings being in flow communication with said openings in said peripheral wall means of said main cylinder means.

* * * * *